(12) United States Patent
Wang et al.

(10) Patent No.: US 9,646,032 B2
(45) Date of Patent: May 9, 2017

(54) TEMPORAL USER ENGAGEMENT FEATURES

(71) Applicant: Microsoft Corporation, Redmond, WA (US)

(72) Inventors: Wenbo Wang, Fairborn, OH (US); Lei Duan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 543 days.

(21) Appl. No.: 14/061,981

(22) Filed: Oct. 24, 2013

(65) Prior Publication Data

US 2015/0120753 A1    Apr. 30, 2015

(51) Int. Cl.
*G06F 17/30* (2006.01)
*G06Q 50/00* (2012.01)

(52) U.S. Cl.
CPC .. *G06F 17/30321* (2013.01); *G06F 17/30864* (2013.01); *G06Q 50/01* (2013.01)

(58) Field of Classification Search
CPC ................................................ G06F 17/30321
USPC ........................................................ 707/746
See application file for complete search history.

(56) References Cited

U.S. PATENT DOCUMENTS

| 7,895,284 | B2 | 2/2011 | Kim |
| 8,219,631 | B2 | 7/2012 | Kim |
| 8,370,486 | B2 | 2/2013 | Kim |
| 8,712,934 | B2 † | 4/2014 | Gross |
| 2003/0074350 | A1* | 4/2003 | Tsuda ................ G06F 17/30867 |
| 2009/0125511 | A1 | 5/2009 | Kumar |
| 2010/0114946 | A1* | 5/2010 | Kumar .............. G06F 17/30035 707/770 |
| 2010/0162093 | A1 | 6/2010 | Cierniak |
| 2010/0211432 | A1* | 8/2010 | Yiu ................... G06F 17/30867 705/7.32 |
| 2011/0022602 | A1 | 1/2011 | Luo et al. |
| 2011/0246457 | A1 | 10/2011 | Dong et al. |

(Continued)

OTHER PUBLICATIONS

Anger et al., "Measuring Influence on Twitter", 2011, pp. 1-4.*

(Continued)

*Primary Examiner* — Rehana Perveen
*Assistant Examiner* — Hicham Skhoun
(74) *Attorney, Agent, or Firm* — The Watson IP Group, PLC; Vladan M. Vasiljevic

(57) ABSTRACT

One or more techniques and/or systems are provided for indexing content based upon index features (e.g., temporal features, user engagement features, and/or outlier features), and/or for providing content within a search result interface based upon such index features and/or rankings. For example, user reaction data associated with content (e.g., a microblog message, a social network post, etc.) may be evaluated to generate a user engagement feature that may be constrained to a time window feature (e.g., the number of shares of a message within the first 10 minutes from publication of the message) to create an index feature for indexing the content within a content index. Responsive to the index feature corresponding to a search query, the content may be provided with search results for the search query. For example, the content may correspond to trending or breaking news associated with the search query.

20 Claims, 9 Drawing Sheets

(56) References Cited

U.S. PATENT DOCUMENTS

| | | | | |
|---|---|---|---|---|
| 2011/0302103 | A1* | 12/2011 | Carmel | G06Q 30/0282 |
| | | | | 705/347 |
| 2011/0307464 | A1 | 12/2011 | Ghosh | |
| 2011/0320437 | A1 | 12/2011 | Kim et al. | |
| 2012/0144413 | A1* | 6/2012 | Wang | G06Q 30/0217 |
| | | | | 725/13 |
| 2012/0147037 | A1* | 6/2012 | Takami | G06F 17/30991 |
| | | | | 345/629 |
| 2012/0150833 | A1 | 6/2012 | Parthasarathy et al. | |
| 2012/0150957 | A1 | 6/2012 | Bonchi | |
| 2012/0158713 | A1* | 6/2012 | Jin | G06F 17/30029 |
| | | | | 707/728 |
| 2013/0086030 | A1 | 4/2013 | De Filippi | |
| 2013/0311408 | A1* | 11/2013 | Bagga | G06N 99/005 |
| | | | | 706/12 |
| 2014/0278308 | A1* | 9/2014 | Liu | H04L 67/22 |
| | | | | 703/6 |
| 2014/0280550 | A1* | 9/2014 | Glass | H04L 67/22 |
| | | | | 709/204 |
| 2014/0280890 | A1* | 9/2014 | Yi | H04L 67/22 |
| | | | | 709/224 |
| 2015/0100587 | A1* | 4/2015 | Walkingshaw | G06F 17/30873 |
| | | | | 707/748 |

OTHER PUBLICATIONS

Chen, et al., "Short and Tweet: Experiments on Recommending Content from Information Streams", Proceedings of The 28th International Conference on Human Factors in Computing systems, Apr. 10, 2010, pp. 1185-1194.

Dai, et al., "Sedna: A Memory Based Key-Value Storage System for Realtime Processing in Cloud", Cluster Computing Workshops, IEEE International Conference, Sep. 24, 2012, pp. 48-56.

Grineva, et al., "Blognoon: Exploring a Topic in the Blogosphere", World Wide Web, ACM, Mar. 28, 2011, pp. 213-216.

"International Search Report and Written Opinion Issued in PCT Application No. PCT/US2014/060790", Mailed Date: Jan. 22, 2015, 11 Pages.

Duan, et al., "An Empirical Study on Learning to Rank of Tweets", In Proceedings of the 23rd International Conference on Computational Linguistics, Aug. 2010, 9 pages, http://dl.acm.org/citation.cfm?id=1873815.

Lee, et al., "BursT: A Dynamic Term Weighting Scheme for Mining Microblogging Messages", In Proceedings of the 8th International Conference on Advances in Neural Networks, May 29, 2011, 10 pages. http://dl.acm.org/citation.cfm?id=2009531.

Carpenter, Hutch, "Presenting Twitter in Search Results", Published on: Jan. 10, 2010, pp. 5, Available at: http://www.innovationexcellence.com/blog/2010/01/10/presenting-twitter-in-search-results/.

Ho, et al., "Modeling and Visualizing Information Propagation in a Micro-blogging Platform", In International Conference on Advances in Social Networks Analysis and Mining, Jul. 25, 2011, 8 pages. http://ieeexplore.ieee.org/stamp/stamp.jsp?tp=&arnumber=5992596.

Cataldi, et al., "Emerging Topic Detection on Twitter based on Temporal and Social Terms Evaluation", In Proceedings of the Tenth International Workshop on Multimedia Data Mining, Jul. 25, 2010, 10 pages. http://pianeta.di.unito.it/~dicaro/papers/twitter2010.pdf.

Lin, et al., "An Event-Based POI Service from Microblogs", In 13th Asia-Pacific Network Operations and Management Symposium, Sep. 21, 2011, 4 pages. http://ieeexplore.ieee.org/stamp/stamp.jsp?tp=&arnumber=6076994.

* cited by examiner
† cited by third party

TEMPORAL USER ENGAGEMENT FEATURES

BACKGROUND

Users may communicate information in a variety of different manners. In an example, a user may post a microblog message through a messaging social network from a mobile device (e.g., the user may create the microblog message about a videogame convention that the user may be attending). In another example, a user may share a picture through an image sharing service from a personal computer. Other users may experience and/or interact with such content. For example, a second user may comment on the picture and/or may share the microblog message so that followers of the second user may also read the microblog message.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for indexing content based upon temporal features and user engagement features, and/or for providing content within a search result interface based upon index features are provided. Content may correspond to a variety of data, such as a microblog message, an image, a video, social network data (e.g., a social network event, a social network message, a social network profile, etc.), a social network post, venue information (e.g., a description of a fishing harbor or museum), entity information (e.g., a description of a celebrity, a description of a company, etc.), and/or a variety of other information.

In an example, the content may be indexed based upon user engagement features (e.g., a user may engage with content by replying to the content, commenting on the content, sharing the content with others, rating the content, emailing the content, viewing the content, experiencing the content, etc.). In another example, the content may be indexed based upon temporal features, such as user engagement during a first time span (e.g., user engagement may be evaluated during the first 10 minutes after the content is published, which may indicate how interesting (e.g., "hot", "fresh", adoption rate, etc.) the content may be to users), a second time span (e.g., user engagement may be evaluated during the past 10 minutes, which may indicate whether the content is still interesting to users (e.g., "fresh" vs. "stale"), and/or other time spans. In another example, the content may be indexed based upon outlier features (e.g., a microblog message of a user may receive abnormally high user engagement relative to other content by the user, thus indicating that the microblog message may comprise relatively interesting and/or useful information such as breaking news). In this way, indexed content may be provided with search results (e.g., a microblog message relevant to a search query may be presented with search results for the search query based upon the microblog message having a ranking above a threshold indicating that the microblog message comprises "fresh" and/or "highly engaging" content) and/or as supplement content through suggestions (e.g., secondary content, entities, people, places, events, breaking news, or other information may be identified from indexed content and provided to users).

In an example of indexing content, user reaction data associated with content of an author maybe evaluated to generate a user engagement feature for the content. The user engagement feature may describe how users engaged with the content (e.g., a raw count, a mean, an average, and/or a standard deviation of replies, comments, shares, the summation of the number of followers of users who shared the content, the summation of the ratios of the number of followers of users who shared the content in relation to the number of followees of such users, etc.). The user engagement feature may be constrained to a time window feature (e.g., a first 10 minutes after creation of the content, the last 10 minutes since receiving a search query used to identify the content for display with search results for the search query, etc.) to generate an index feature for the content. Other features, such as outlier features (e.g., the content may receive abnormally high user attention with respect to other content by the author), may be identified for inclusion within the index feature. In this way, the index feature may be assigned to the content for indexing within a content index.

In an example of providing content within a search result interface, a search query may be received (e.g., "best time to go to the video game convention this week"). A search feature associated with the search query may be identified (e.g., a video game convention topic determined by a query classifier). The content index may be queried using the search feature to identify content assigned an index feature corresponding to the search feature and/or having a ranking above a threshold indicating that the content is "fresh" and/or "popular" (e.g., a ranking based upon a time window feature indicating "freshness", a user engagement feature and/or an outlier feature indicating "popularity"). In this way, the content may be provided within a search result interface for the search query (e.g., provided through a sidebar interface, provided in-line between search results, interspersed amongst search results, displayed through an operating system search interface such as a search charm, etc.). In another example, the content may be provided as an interactive histogram corresponding to the time window feature and/or displaying user engagement data (e.g., a histogram of shares by users during a time span of the time window feature).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
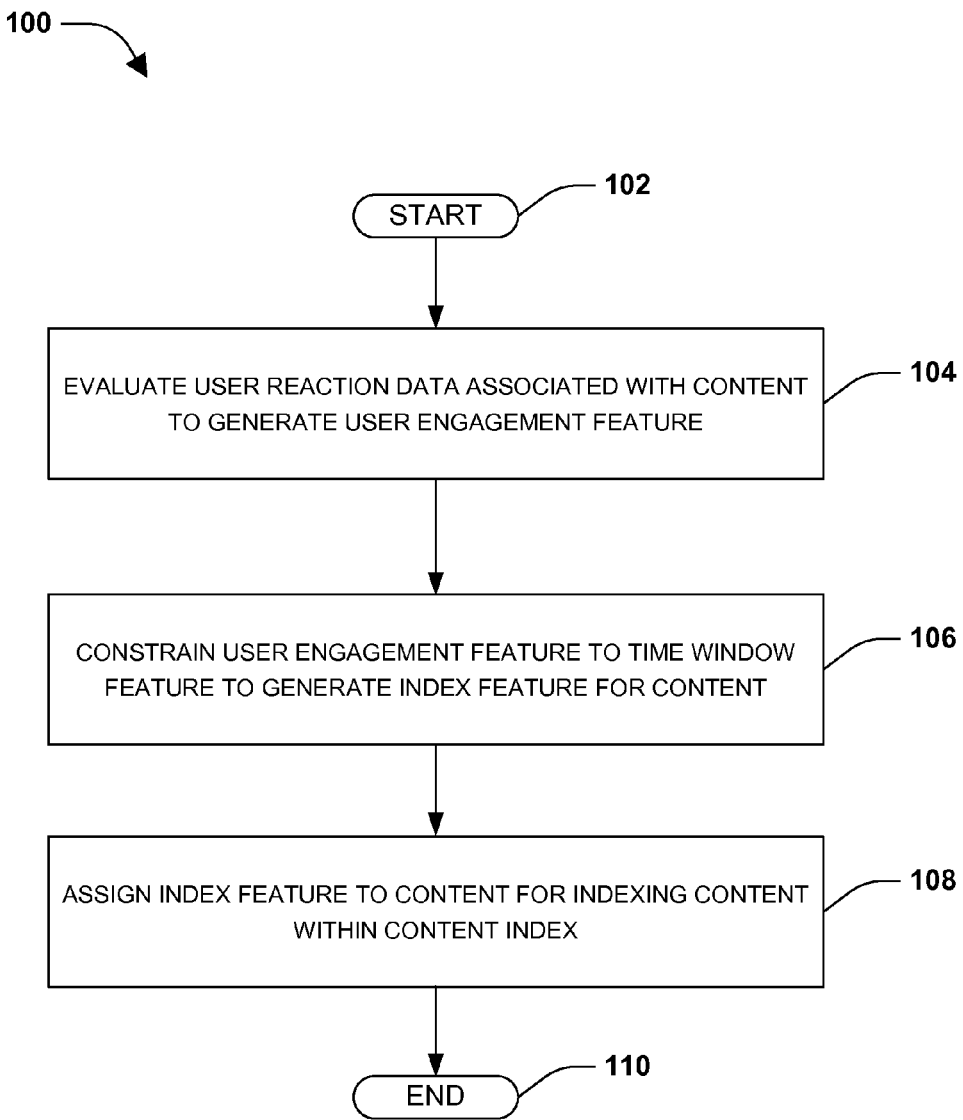
FIG. 1 is a flow diagram illustrating an exemplary method of indexing content based upon temporal features and user engagement features.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of indexing content based upon temporal features and user engagement features is illustrated by an exemplary method 100 of FIG. 1. At 102, the method starts. In an example, an author may generate content that may be experienced by other users (e.g., the author may publish a microblog message about a video game convention that the author is currently attending). Other users may reply to the content, share the content, rate the content, comment on the content, and/or experience the content (e.g., a social network friend of the author may share the microblog message with followers of the social network friend). Such user engagement may be captured as user reaction data associated with the content.

At 104, the user reaction data may be evaluated to generate a user engagement feature for the content. In an example, the user engagement feature corresponds to the number of users that engaged with the content (e.g., shared the microblog message, replied to the microblog message, etc.). In an example, the user engagement feature corresponds to the summation of ratios of the number of followers of users that engaged with the content to the number of friends of these users (e.g., such that the user engagement feature takes into account social network influence of the sharing user: the more followers/friends a user has, the more influential the user is). In an example, the user engagement feature corresponds to the summation of the ratios of the number of followers of users that engaged with the content to the number of followees of these users (e.g., if a sharing user has a large number of followers but a small number of followees then the sharing user may have substantial social network influence compared to a second sharing user that has a large number of followers and a large number of followees, indicating that the second sharing user may have a large number of followers merely due to courtesy follower requests in response to the second sharing user following others). In this way, the user engagement feature may correspond to a variety of metrics associated with users engaging with content of the author.

At 106, the user engagement feature may be constrained to a time window feature to generate an index feature for the content. In an example, the time window feature comprises a first time window corresponding to a first time span from creation of the content to an initial impression time threshold (e.g., the first 10 minutes after creation/publishing of the microblog message may indicate how receptive/interested a social network community may be to subject matter of the microblog message). The time window feature may comprise any number or type of time windows, such as a second time window corresponding to a second time span from a search query identification time back to a freshness time threshold (e.g., the microblog message may be relevant to a search query such that the microblog message may be provided with search results for the search query, and thus the second time window may correspond to a last 10 minutes before receiving the search query in order to determine whether the microblog message is still interesting).

In an example, a variety of other features may be generated for inclusion within the index feature for the content. For example, a set of content by the author may be evaluated to determine calculated user engagement data associated with the author (e.g., a mean, a standard deviation, and/or other calculated values of user engagement, such as the number of shares/comments/replies/views of content by the author during the past 4 months of content created by the author). The user reaction data for the content (e.g., the number of shares for the microblog message) may be evaluated against the calculated user engagement data (e.g., calculated values of content created by the author in the past 4 months) to determine an outlier feature for the content. The outlier feature may be indicative of whether the microblog message receives average user engagement or abnormally high user engagement with respect to how users react to other content by the author. For example, a celebrity may create a breakfast message about eating breakfast, which may be shared 2 million times. However, the 2 million shares may not be indicative of how interesting or useful the content of the breakfast message may be, and thus the 2 million shares may be compared with calculated user engagement data for other messages by the celebrity (e.g., an average of 2.5 million shares). Thus, the 2 million shares of the breakfast message compared with the 2.5 million average shares may indicate that the breakfast message does not comprise interesting content. In another example, a user may create a plane crash message that receives 2,000 shares. When comparing the 2,000 shares of the plane crash message with an average of 15 shares for the user, the 2,000 shares may indicate that the plane crash message comprises interesting information.

At 108, the index feature may be assigned to the content for indexing the content within a context index. In an example, a plurality of content, associated with a variety of authors, within the context index may be ranked based upon index features. For example, a relatively high rank for content may indicate that the content may comprise relatively interesting or useful information (e.g., "fresh" content, "engaging content", "popular" content, etc.), which may be provided with search results, used to identify supplemental content (e.g., secondary content, people, places, events, entities, and/or other trending/newsworthy information), and/or displayed through various interfaces such as a histogram.

In an example of utilizing content within the content index, a search query may be received, such as through a search interface (e.g., "what companies will be at the video game convention"). A search feature associated with the search query may be identified (e.g., a video game convention topic). The content index may be queried using the search feature to identify corresponding content based on an index feature of the content corresponding to the search feature of the search query. For example, the microblog message about a video game convention may be identified as corresponding to the video game convention topic and/or may be identified based upon the microblog message having a ranking above a threshold that may indicate that the microblog message may be "fresh" (e.g., based upon a time window feature corresponding to the last 10 minutes of user engagement for the microblog message before the search query was identified) and/or interesting/informative (e.g., based upon a user engagement feature and/or an outlier feature indicating a threshold number of users and/or users having social network influence engaged with the microblog message). The microblog message may be provided within a search result interface for the search query. In an example, the microblog message may be provided within a side bar interface. In another example, the microblog message may be provided in-line, such as between a first search result and a second search result of search results for the search query.

In an example of utilizing content within the content index, outlier features may be evaluated to identify a topic that may be trending and/or breaking news (e.g., an outlier feature above a threshold may indicate that a marathon message of an author may comprise information that may be relatively more interesting to users in relation to other content by the author). Supplemental information associated with the topic may be identified (e.g., images, race information, course information, news articles, racer biography, and/or other information about the marathon may be identified, retrieved, and/or included as the supplemental information) (e.g., FIG. 6). The supplemental information may be provided as a suggestion. For example, the suggestion may be provided based upon a variety of triggers (e.g., a user having an interesting in running, a user having a calendar entry about running, a user having a current location near the marathon course, a user having a social network profile indicative of the user having an interest in running or watching others run, etc.). In this way, content may be indexed and/or utilized based upon various temporal features, user engagement features, and/or outlier features. At 110, the method ends.

Figure 2A:
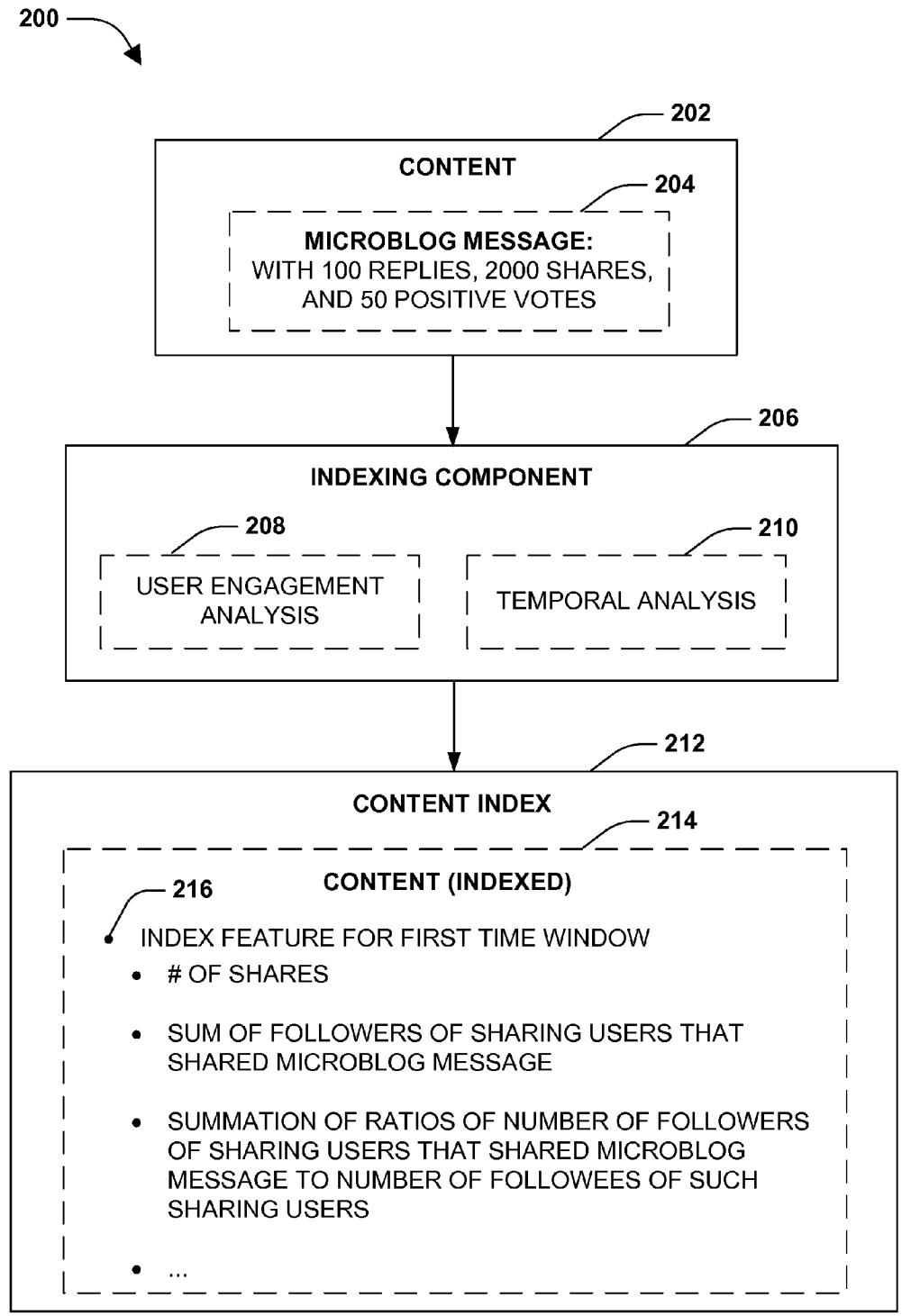
FIG. 2A is a component block diagram illustrating an exemplary system for indexing content based upon temporal features and user engagement features.

FIG. 2A illustrates an example of a system 200 for indexing content based upon temporal features and user engagement features. The system 200 comprises an indexing component 206. The indexing component 206 may be configured to perform user engagement analysis 208 and/or temporal analysis 210 on content 202 by an author. For example, the author may create content 202 comprising a microblog message 204 about a Bigfoot citing by the author while hiking through a forest. User reaction data for the microblog message 204 may indicate that the microblog message 204 received 200 replies, 2,000 shares, and 50 positive votes. A user engagement feature may be generated by the user engagement analysis 208 based upon the user reaction data (e.g., the number of shares, a summation of followers of sharing users that shared the microblog message 204, the summation of ratios of the number of followers of sharing users that shared the microblog message 204 to the number of followees of these sharing users, and/or a variety of other calculated metrics). The temporal analysis 210 may constrain the user engagement feature to a time window feature to create an index feature 216 for the content 202. For example, the user engagement data may be constrained to a first time window corresponding to a first time span from creation of the content 202 to an initial impression time threshold (e.g., a first ten minutes after creation/publication of the microblog message 204). The indexing component 206 may be configured to index the content 202 within a content index 212, resulting in indexed content 214.

Figure 2B:
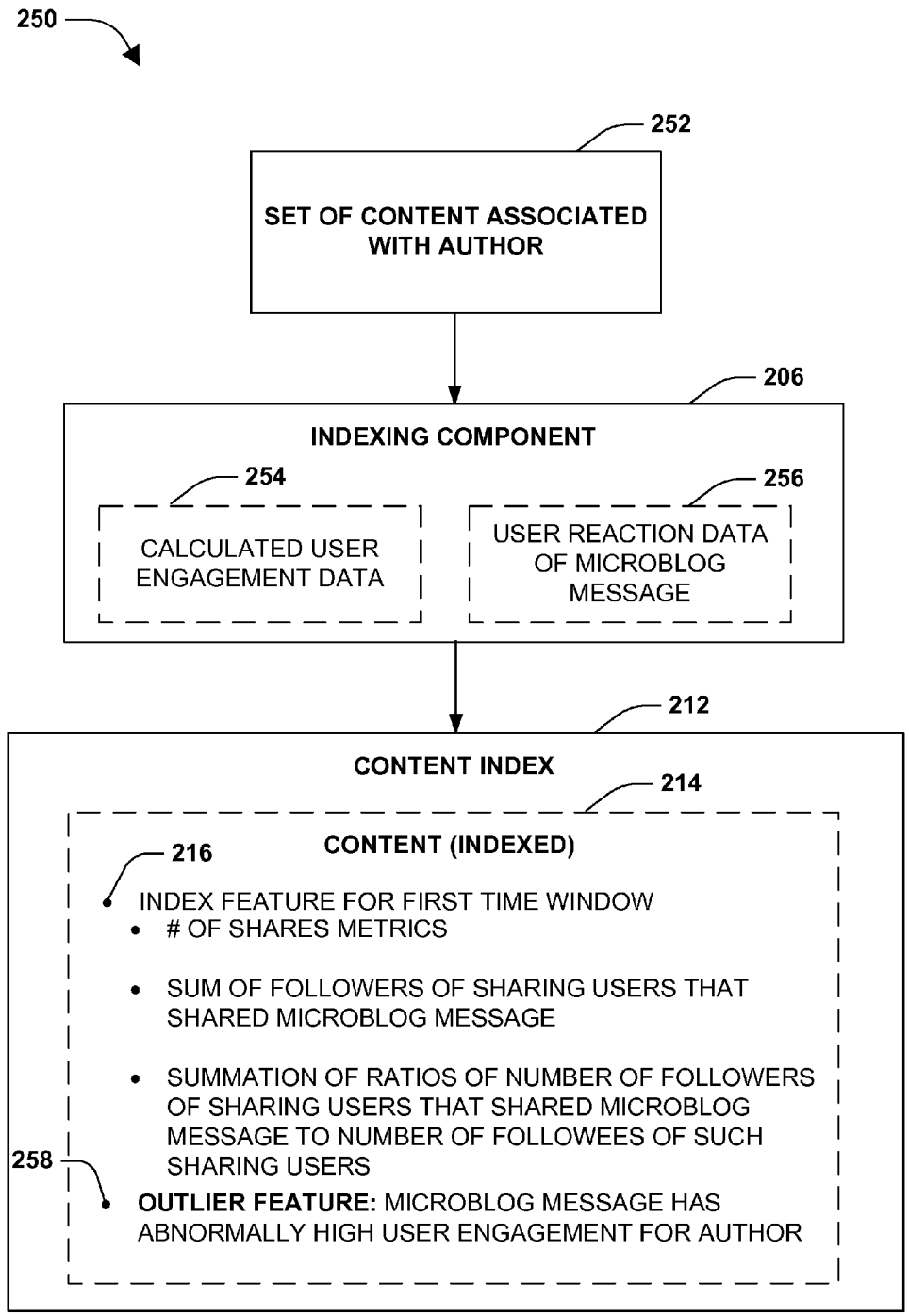
FIG. 2B is a component block diagram illustrating an exemplary system for indexing content based upon outlier features.

FIG. 2B illustrates an example of a system 250 for indexing content based upon outlier features. The system 250 may comprise an indexing component 206. The indexing component 206 may be configured to evaluate a set of content 252 associated with an author (e.g., images, microblog messages, social network posts, or other content created by the author of the content 202 of FIG. 2A) to determine calculated user engagement data 254 associated with the author (e.g., a mean user engagement and/or a standard deviation for the set of content 252). The indexing component 206 may be configured to evaluate user reaction data 256 of content (e.g., microblog message 204 of content 202 of FIG. 2A) against the calculated user engagement data 254 to determine an outlier feature 258 for the content 202. For example, the outlier feature 258 may indicate that the microblog message 204 received abnormally high user engagement with respect to other content by the author (e.g., the microblog message 204 may receive 2,000 shares whereas other content by the author may average 15 shares). The outlier feature 258 may indicate that the microblog message 204 may be relatively interesting and/or comprise useful information for other users. In this way, the outlier feature 258 may be included within an index feature 216 for the content 202 (e.g., indexed content 214).

In an example of determining an outlier feature for an author, an outlier formula may be applied to messages of the author. For example, the outlier formula corresponds to: (feature−mean)/(standard deviation), where the feature corresponds to, among other things, user engagement for a particular piece of content within a time window (e.g., a feature corresponds to the number of shares of a new microblog message) and/or where the mean and standard deviation correspond to a historical mean and standard deviation regarding messages of the author within a particular time window. For example, where, within a 24 time window, a first microblog message of the author is shared 1 time, a second microblog message of the author is shared 2 times, a third microblog message of the author is shared 3 times, and a fourth microblog message of the author is shared 4 times, the mean is 2.5 (e.g., 10 shares/4 messages) and the standard deviation is 1.29099. Where a first new message from the author is shared 20 times within a particular time window (e.g., within 10 minutes after the message was initially sent), the outlier formula provides an outlier feature of 13.555 based upon (20−2.5)/1.29099. Where a second new message from the author is merely shared 1 time within a particular time window (e.g., within 10 minutes after the message was initially sent), the outlier formula provides an outlier feature of −1.162 based upon (1−2.5)/1.29099. The larger the outlier feature the more interesting the message is likely to be, thus the first new message is probably more interesting than the second new message. In this way, if user engagement for a particular piece of content by the author is relatively larger (e.g., a value for the feature is relatively large, such as 20) than the mean and standard deviation of user engagement for a sampling of content by the author (e.g., mean of 2.5 and standard deviation of 1.29099), then the particular piece of content may be relatively more interesting than the usual content by the author (e.g., the larger the outlier feature, the more interesting the content may be compared to other content by the user).

In another example of determining an outlier feature, a set of users (U={$u_1, u_2, \ldots u_m$}) that engaged with content t is identified. The number of followers that user $u_i$ has is represented by $f_i$ ($1<=i<=m$), and $g_i$ is the number of followees that user $u_i$ has. Accordingly, a feature may be represented as $$\sum_{i=1}^{m} \frac{f_i}{g_i}.$$

However, because $g_i$ may be zero, a constant n (e.g., 1, 2, etc.) may be applied to the denominator and the numerator for smoothing, resulting in $$\sum_{i=1}^{m} \frac{f_i + n}{g_i + n}.$$

However, because a user may have a relatively large ratio of followers to followees (e.g., 1000 followers and merely 1 followee) some fluctuation may result. Such fluctuation may be reduced by utilizing a feature corresponding to $$\sum_{i=1}^{m} \log\left(\frac{f_i + n}{g_i + n}\right)$$

to consider effects of other users, which reduces fluctuations related to a single user.

Figure 3:
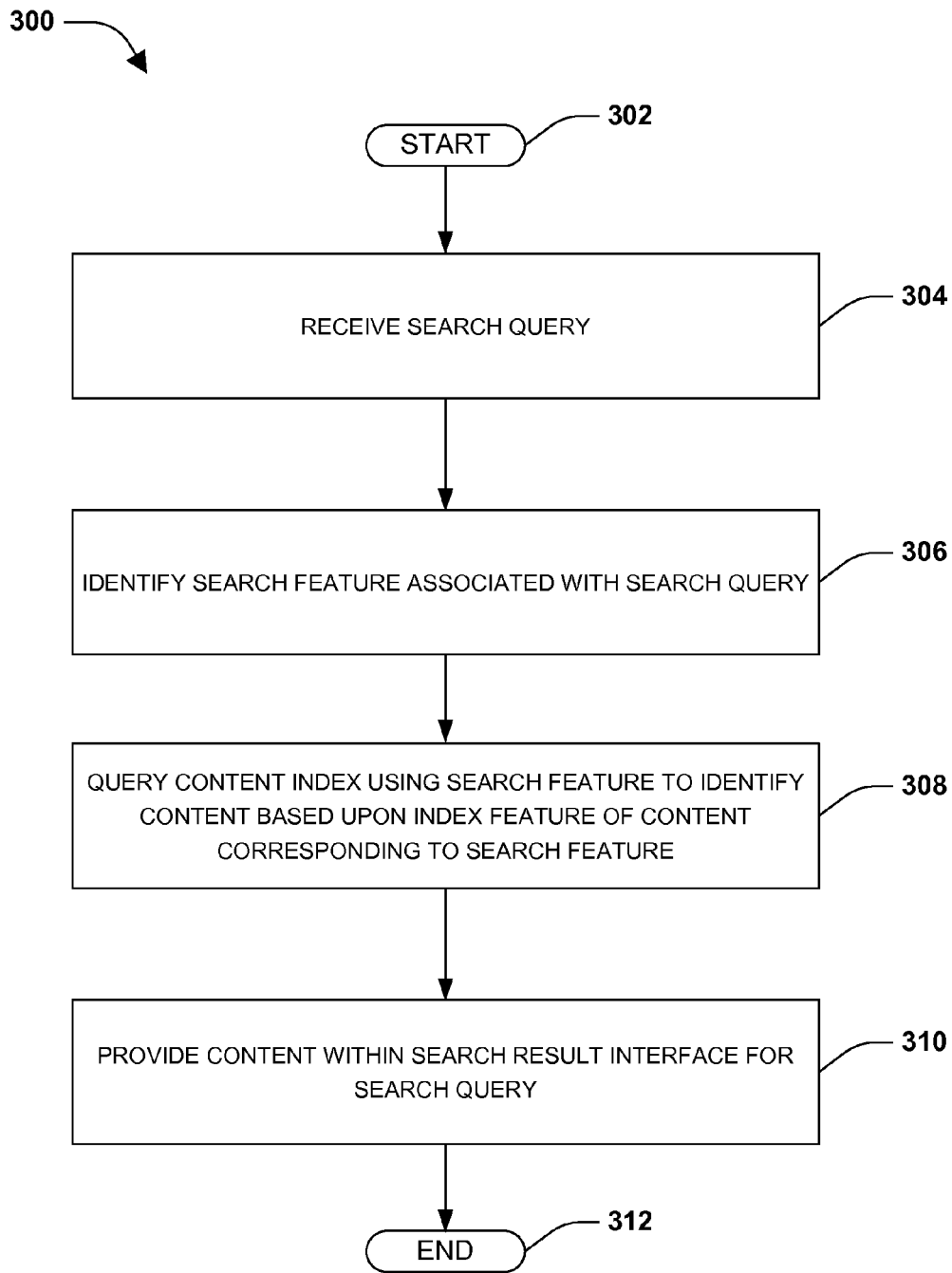
FIG. 3 is a flow diagram illustrating an exemplary method of providing content within a search result interface based upon index features.

An embodiment of providing content within a search result interface based upon index features is illustrated by an exemplary method 300 of FIG. 3. At 302, the method starts. A content index (e.g., content index 212 of FIGS. 2A and 2B) may comprise a plurality of content by various authors that may be indexed and/or ranked based upon index features, such as outlier features, user engagement features, time window features, and/or other features. In an example, a user engagement feature may be constrained to one or more time spans of a time window feature (e.g., user reactions to a social network post within the first 10 minutes since publishing of the social network post). In another example, the outlier feature may correspond to user reaction to content compared with user reaction to a set of content by the author. The content index may be utilized to identify content that may be provided through a search result interface (e.g., "fresh" and/or "popular" content).

At 304, a search query may be received (e.g., "why is my oak tree dying" may be received from a Cleveland resident). At 306, a search feature associated with the search query may be identified (e.g., an oak tree health topic). At 308, the content index may be queried using the search feature to identify content (e.g., a social network post regarding how an author saw an airplane spray a fog of chemicals over trees in Cleveland) having an index feature corresponding to the search feature. In an example, the index feature may indicate that the social network post has a rank above a threshold (e.g., the rank may indicate that the social network post comprises information that may have a relatively high interest to users, such as breaking news and/or trending information). Accordingly, at 310, the content may be provided within a search result interface for the search query. In an example, the social network post may be provided within a side bar interface. In another example, the social network post may be provided in-line, such as between a first search result and a second search result of search results for the search query. At 312, the method ends.

Figure 4:
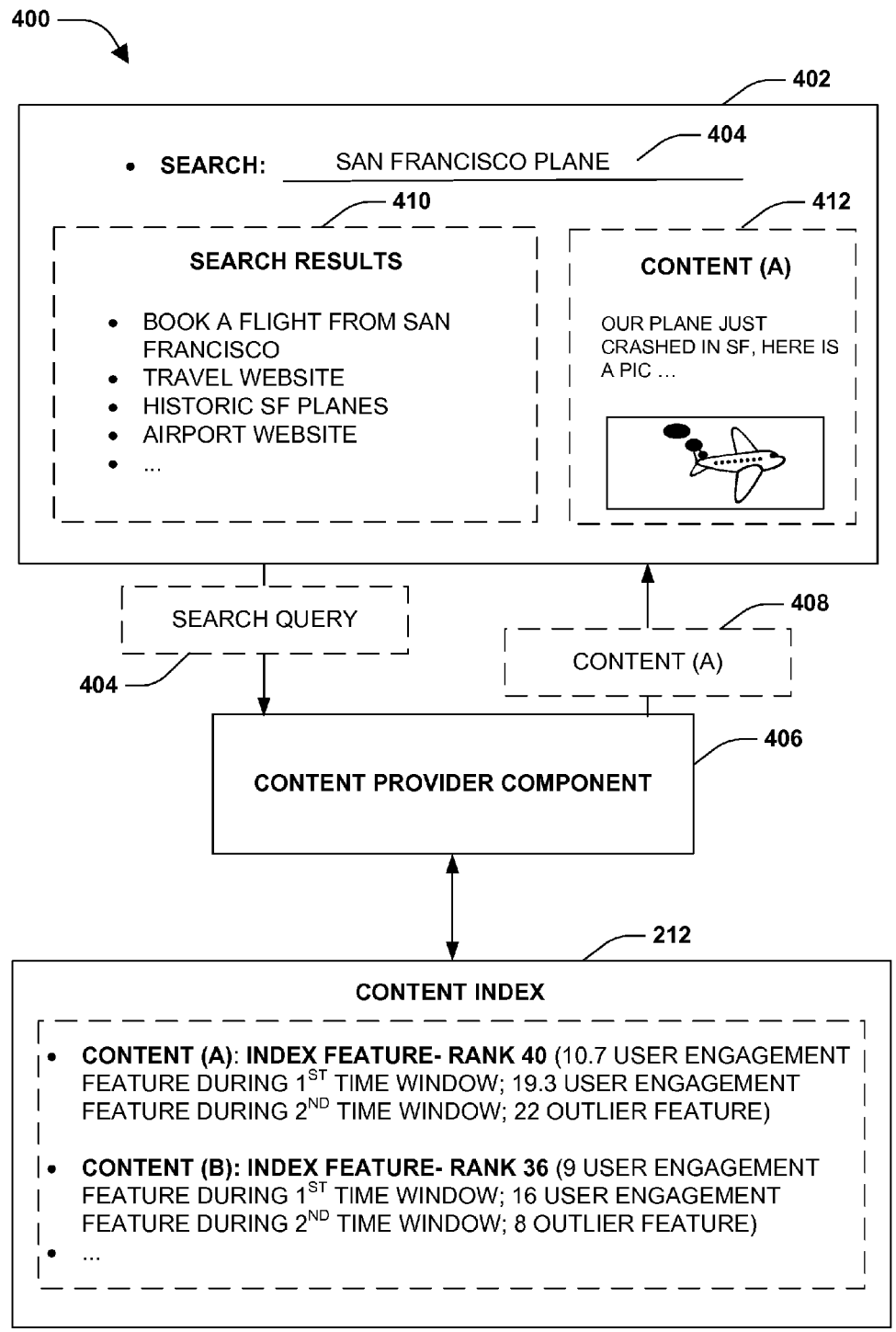
FIG. 4 is a component block diagram illustrating an exemplary system for providing content within a search result interface based upon index features.

FIG. 4 illustrates an example of a system 400 for providing content within a search result interface based upon index features and/or rankings. The system 400 may comprise a content provider component 406 associated with a content index 212. The content index 212 may comprise a plurality of content indexed based upon index features (e.g., content (A) 408 having a rank 40 based upon a first index feature indicating a user engagement feature of 10.7 during a first time window such as a first 10 minutes after publication of content (A) 408, a user engagement feature of 19.3 during a second time window such as the last 10 minutes since identifying a search query 404, and an outlier feature of 22, content (B) having a rank 36 based upon a second index feature, etc.).

In an example, the content provider component 406 may receive the search query 404 (e.g., "San Francisco plane" submitted through a search interface 402). A search feature associated with the search query 404 may be identified (e.g., a query classifier may provide the content provider component 406 with the search feature, such as a San Francisco airplanes topic). The content provider component 406 may query the content index 212 using the search feature to identify content (A) 408 as having an index feature corresponding to the search feature and/or having a ranking above a threshold. The content provider component 406 may provide the content (A) 408 within a search result interface for the search query. For example, the search result interface may comprise search results 410 and a side bar interface 412 comprising the content (A) 408. Content (A) 408 may comprise a social network post with an image about a plane crash in San Francisco, which may have received a substantial amount of user engagement within the first time window (e.g., indicating a relatively high initial impression) and/or within the second time window (e.g., indicating that subject matter is still relevant and/or fresh).

Figure 5:
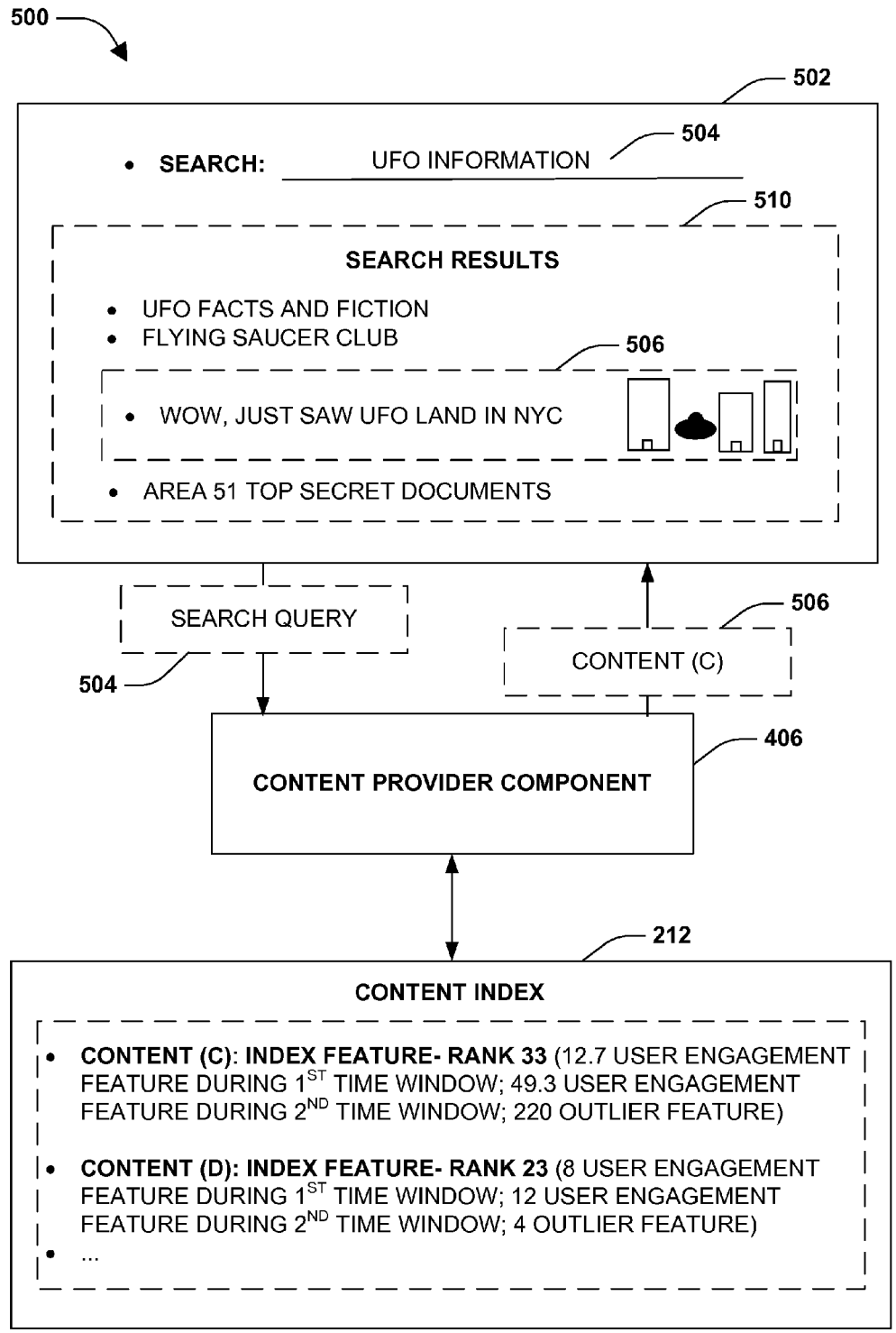
FIG. 5 is a component block diagram illustrating an exemplary system for providing content within a search result interface based upon index features.

FIG. 5 illustrates an example of a system 500 for providing content within a search result interface based upon index features and/or rankings. The system 500 may comprise a content provider component 406 associated with a content index 212. The content index 212 may comprise a plurality of content indexed based upon index features (e.g., content (C) 506 having a rank 33 based upon a first index feature indicating a user engagement feature of 12.7 during a first time window such as a first 10 minutes after publication of content (C) 506, a user engagement feature of 49.3 during a second time window such as the last 10 minutes since identifying a search query 504, and an outlier feature of 220, content (D) having a rank 23 based upon a second index feature, etc.).

In an example, the content provider component 406 may receive the search query 504 (e.g., "UFO information" submitted through a search interface 502). A search feature associated with the search query 504 may be identified (e.g., a query classifier may provide the content provider component 406 with the search feature such as a UFO topic). The content provider component 406 may query the content index 212 using the search feature to identify content (C) 506 as having an index feature corresponding to the search feature and/or having a ranking above a threshold. The content provider component 406 may provide the content (C) 506 within a search result interface for the search query. For example, the search result interface may comprise the content (C) 506 inserted between a flying saucer club search result and an area 51 top secret documents search result of search results 510 for the search query 504. Content (C) 506 may comprise a social network post with an image about a UFO landing in NYC, which may have received a substantial amount of user engagement within the first time window (e.g., indicating a relatively high initial impression) and/or within the second time window (e.g., indicating that subject matter is still relevant and/or fresh). A location within the search results to insert the content may be determined by comparing the content to other search results (e.g., temporal considerations, freshness considerations, relevance considerations, veracity considerations, etc.).

Figure 6:
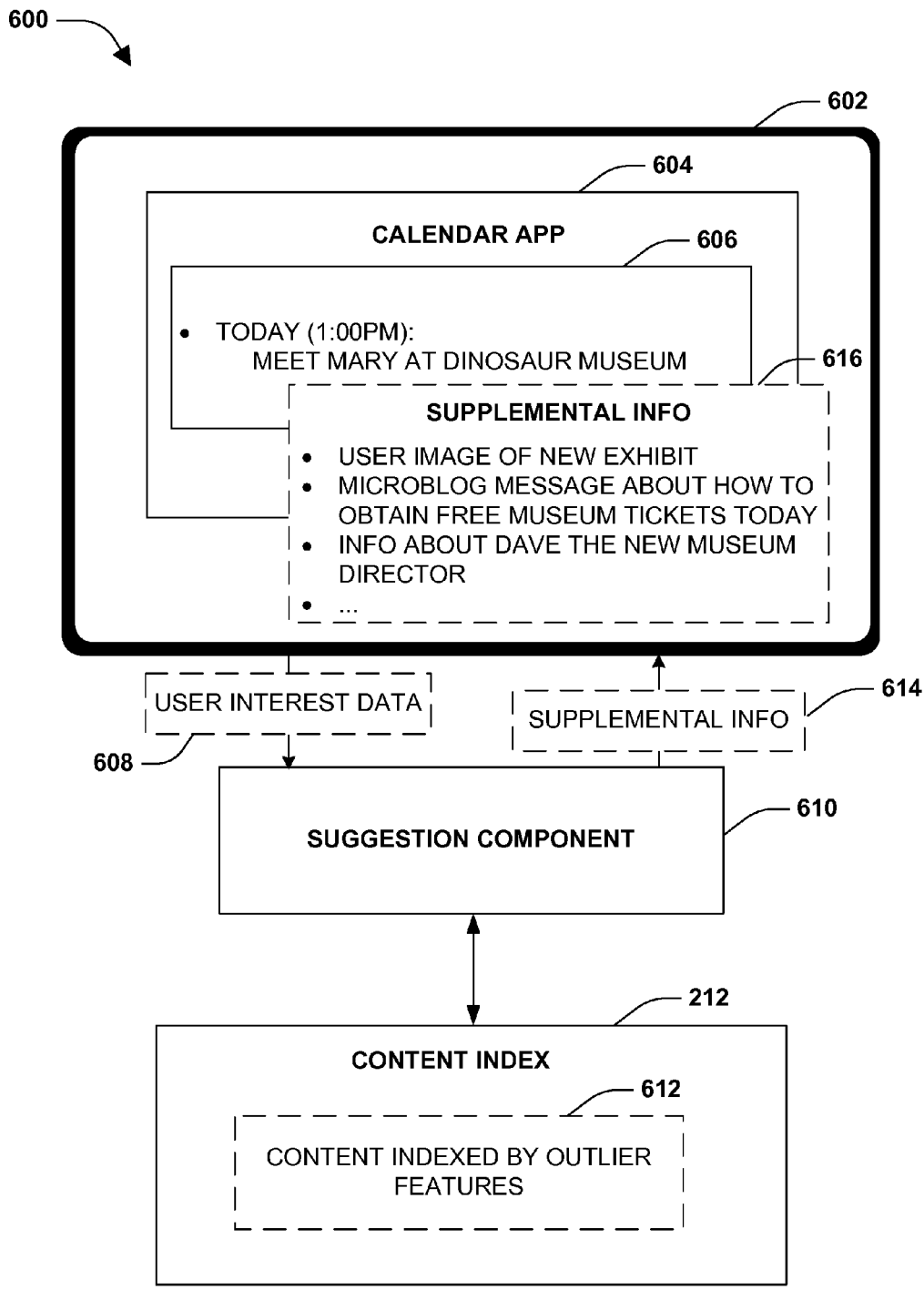
FIG. 6 is a component block diagram illustrating an exemplary system for providing supplemental information as a suggestion.

FIG. 6 illustrates an example of a system 600 for providing supplemental information 614 as a suggestion 616. The system 600 comprises a suggestion component 610 associated with a content index 212 comprising a plurality of content 612 indexed by features, such as outlier features indicative of whether content by an author received abnormally high user engagement compared with other content by the author (e.g., thus indicating that the content comprises relatively interesting information such as breaking news and/or trending information). The suggestion component 610 may receive user interest data 608 associated with a user of a computing device 602. For example, the user may link a calendar app 604 and/or any other information source (e.g., a social network profile, email data, etc.) to the suggestion component 610 (e.g., the user may opt-in or opt-in to link particular information sources to the suggestion component 610). The suggestion component 610 may determine that the user interest data 608 corresponds to a calendar entry 606 indicating that the user has a meeting with Mary at a dinosaur museum today at 1:00 pm. Accordingly, the suggestion component 610 may identify content within the context index 212 that corresponds to the user interest data (e.g., a social network post about the dinosaur museum). The suggestion component 610 may identify supplemental information 614 associated with a topic (e.g., a museum topic) of such content, such as a user image of a new exhibit at the dinosaur museum, a microblog message about how to obtain free museum tickets today, information about Dave the new museum director, and/or other secondary content, entities, places, people, etc. The supplement information 614 may be provided as the suggestion 616.

Figure 7:
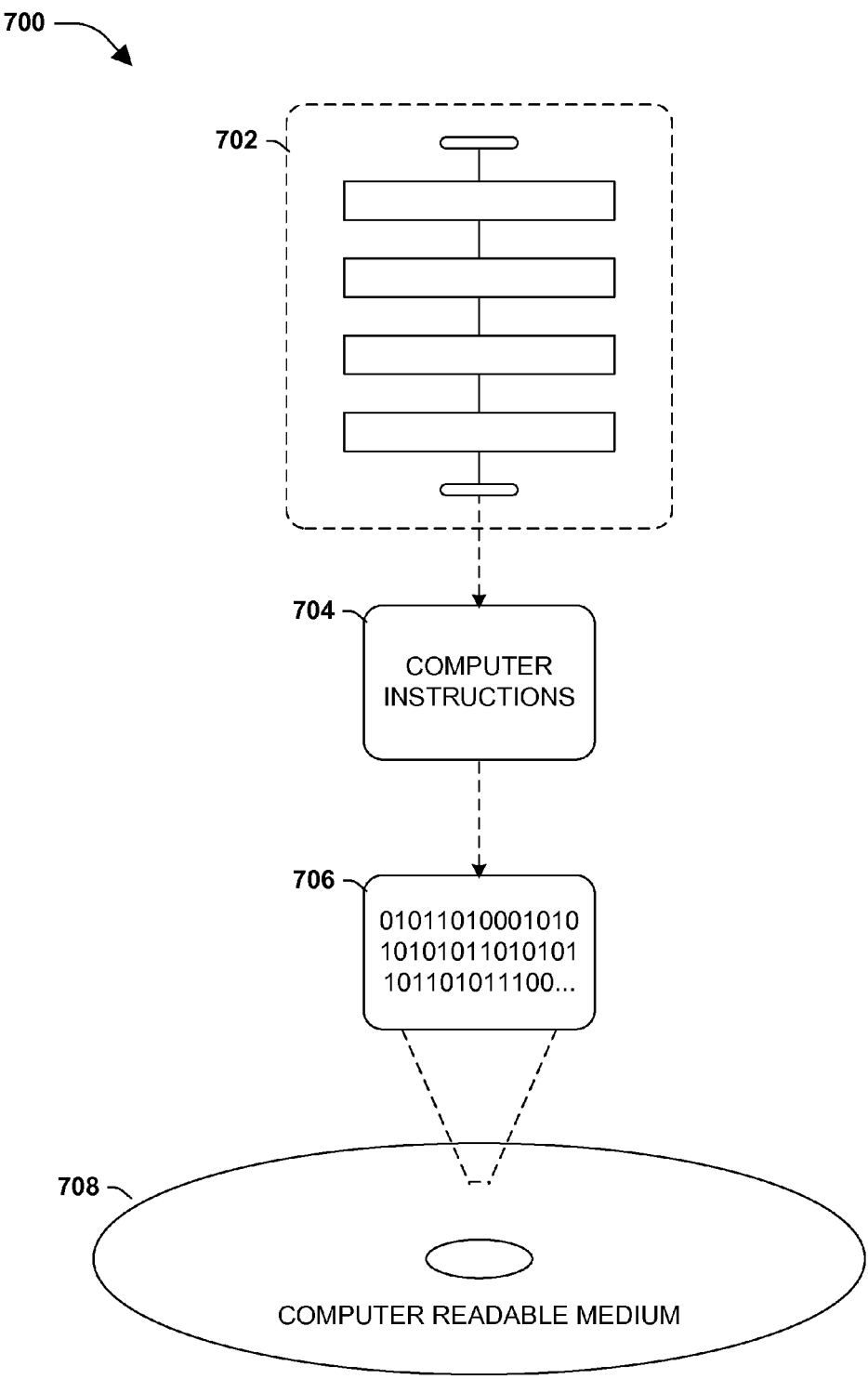
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1 and/or at least some of the exemplary method 300 of FIG. 3, for example. In some embodiments, the processor-executable instructions 704 are configured to implement a system, such as at least some of the exemplary system 200 of FIG. 2A, at least some of the exemplary system 250 of FIG. 2B, at least some of the exemplary system 400 of FIG. 4, at least some of the exemplary system 500 of FIG. 5, and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
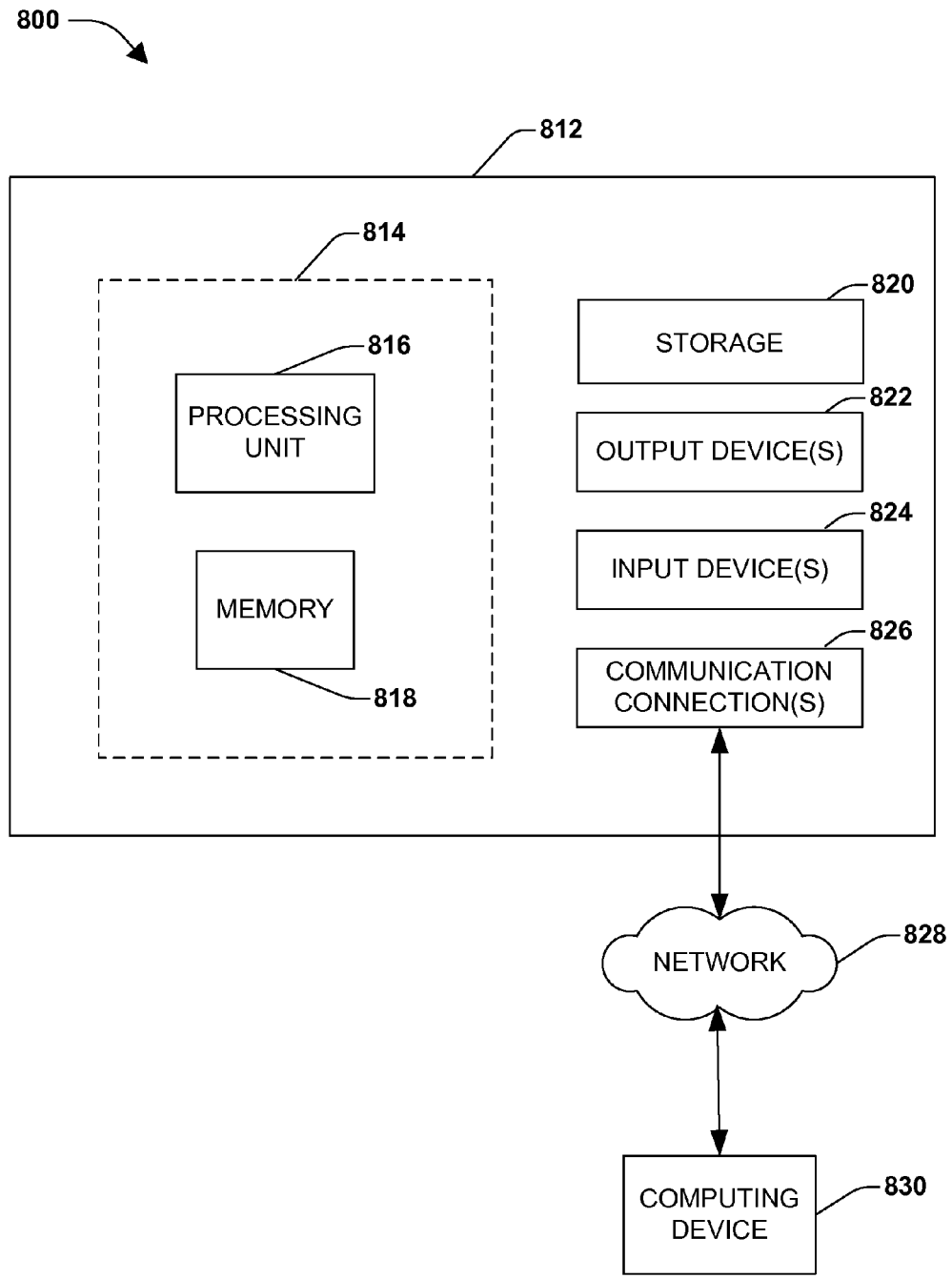
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of ranking content within a computer search index, the method comprising:
   evaluating other users' engagement with a first content, authored by a first user, during a first time period that commences with the posting of all of the first content;
   evaluating other users' engagement with the first content during a second time period preceding receipt of a search query to which the first content is responsive, the second time period being both after different from, and exclusive of, the first time period;
   evaluating an outlier popularity of the first content that is based on a difference between an average amount of other users' engagement with other content authored by the first user and an amount of other users' engagement with the first content;
   assigning an indexing value to the first content based on a combination of: the other users' engagement with the first content during the first time period, the other users' engagement with the first content during the second time period and the outlier popularity of the first content; and
   ranking the first content within the computer search index based on the indexing value assigned to the first content.

2. The method of claim 1, wherein the other users' engagement with the first content comprises at least one of: replying to the first content, sharing the first content, rating the first content, commenting on the first content, viewing the first content, or forwarding the first content.

3. The method of claim 2, wherein the evaluating the other users' engagement with the first content comprises determining a summation of a number of followers of those individual users who engaged with the first content.

4. The method of claim 2, wherein the evaluating the other users' engagement with the first content comprises determining a summation of ratios comparing a number of followers of those individual users who engaged with the first content as compared with a number of followees of those same users.

5. The method of claim 1, further comprising:
   receiving the search query;
   identifying search results responsive to the search query using the computer search index;
   providing at least some of the identified search results in an ordered list within a search result interface physically generated on a physical display device that is communicationally coupled to a computing device from which the search query was received; and
   providing the first content together with the at least some of the identified search results within the search interface.

6. The method of claim 5, wherein the first content is displayed visually between a first one and a second one of the identified search results in the search result interface.

7. The method of claim 5, wherein the first content is in a side bar in the search result interface separate from the ordered list of the least some of the identified search results.

8. The method of claim 1, wherein the outlier popularity is evaluated based on a standard deviation of the amount of the other users' engagement with the other content authored by the first user.

9. The method of claim 1, further comprising:
   determining, based on the outlier popularity, that the first content references a topic that is trending;
   identifying supplemental information associated with the topic; and
   providing the supplemental information as a suggestion.

10. The method of claim 9, wherein the providing the supplemental information as the suggestion was in response to receiving user interest data indicative of a user interest in the topic.

11. A physical display device having physically generated thereon a user interface comprising:
   an ordered list of search results that are responsive to a search query; and
   a first content authored by a first user;
   wherein the first content was selected for presentation within the user interface, from among other content authored by other users that is also responsive to the search query, based on a combination of:
      other users' engagement with the first content during a first time period that commences with the posting of all of the first content;
      other users' engagement with the first content during a second time period preceding receipt of the search query, the second time period being both after, and exclusive of, the first time period; and
      an outlier popularity of the first content that is based on a difference between an average amount of other users' engagement with other content authored by the first user and an amount of other users' engagement with the first content.

12. The physical display device of claim 11, wherein the first content is displayed visually between a first one and a second one of the search results in the user interface.

13. The physical display device of claim 11, wherein the first content is in a side bar in the user interface separate from the ordered list of the search results.

14. A computing device comprising:
   one or more hardware processing units; and
   one or more computer-readable storage media comprising computer-executable instructions, which, when executed by at least some of the one or more hardware processing units, cause the computing device to:
      evaluate other users' engagement with a first content, authored by a first user, during a first time period that commences with the posting of the first content;
      evaluate other users' engagement with the first content during a second time period preceding receipt of a search query to which the first content is responsive, the second time period being both after, and exclusive of, the first time period;
      evaluate an outlier popularity of the first content that is based on a difference between an average amount of other users' engagement with other content authored by the first user and an amount of other users' engagement with the first content;
      assign an indexing value to the first content based on a combination of: the other users' engagement with the first content during the first time period, the other users' engagement with the first content during the second time period and the outlier popularity of the first content; and rank the first content within the computer search index based on the indexing value assigned to the first content.

15. The computing device of claim 14, wherein the other users' engagement with the first content comprises at least one of: replying to the first content, sharing the first content, rating the first content, commenting on the first content, viewing the first content, or forwarding the first content.

16. The computing device of claim 15, wherein the evaluating the other users' engagement with the first content comprises determining a summation of a number of followers of those individual users who engaged with the first content.

17. The computing device of claim 15, wherein the evaluating the other users' engagement with the first content comprises determining a summation of ratios comparing a number of followers of those individual users who engaged with the first content as compared with a number of followees of those same users.

18. The computing device of claim 14, wherein the outlier popularity is evaluated based on a standard deviation of the amount of the other users' engagement with the other content authored by the first user.

19. The computing device of claim 14, wherein the computer-readable storage media comprise further computer-executable instructions which, when executed by at least some of the one or more hardware processing units, cause the computing device to further:
   determine, based on the outlier popularity, that the first content references a topic that is trending;
   identify supplemental information associated with the topic; and
   provide the supplemental information as a suggestion.

20. The computing device of claim 19, wherein the providing the supplemental information as the suggestion was in response to receiving user interest data indicative of a user interest in the topic.

* * * * *